(12) United States Patent
Ibrahim et al.

(10) Patent No.: US 8,982,698 B2
(45) Date of Patent: Mar. 17, 2015

(54) TECHNIQUE FOR TRANSMISSION BY A NODE OF A COMMUNICATIONS NETWORK

(75) Inventors: Ali Ibrahim, Vanves (FR); Luca Muscariello, Chatenay-Malabry (FR); James Roberts, Voisins le Bretonneux (FR)

(73) Assignee: Orange, Paris (FR)

( * ) Notice: Subject to any disclaimer, the term of this patent is extended or adjusted under 35 U.S.C. 154(b) by 357 days.

(21) Appl. No.: 12/988,673

(22) PCT Filed: May 5, 2009

(86) PCT No.: PCT/FR2009/050829
§ 371 (c)(1),
(2), (4) Date: Oct. 20, 2010

(87) PCT Pub. No.: WO2009/150335
PCT Pub. Date: Dec. 17, 2009

(65) Prior Publication Data
US 2011/0038383 A1    Feb. 17, 2011

(30) Foreign Application Priority Data

May 16, 2008  (FR) ...................................... 08 53162

(51) Int. Cl.
*H04L 12/26* (2006.01)
*H04W 52/26* (2009.01)

(52) U.S. Cl.
CPC .................................. *H04W 52/267* (2013.01)
USPC ........... 370/235; 370/229; 370/230; 370/231; 370/232; 370/233

(58) Field of Classification Search
CPC ..... H04L 1/0001; H04L 47/10; H04W 52/04; H04W 52/46; H04B 7/208; H04J 3/1682
USPC .............. 370/229, 230, 230.1, 231, 232, 233, 370/234, 235
See application file for complete search history.

(56) References Cited

U.S. PATENT DOCUMENTS

| 7,542,421 B2 * | 6/2009 | Srikrishna et al. ............. 370/235 |
| 8,098,680 B2 * | 1/2012 | Chen et al. ..................... 370/447 |
| 2005/0058151 A1 * | 3/2005 | Yeh .............................. 370/445 |

(Continued)

FOREIGN PATENT DOCUMENTS

FR    2 799 322 A1    4/2001
WO   WO 97/25787 A1   7/1997

*Primary Examiner* — Chandrahas Patel
*Assistant Examiner* — Lan Huong Truong
(74) *Attorney, Agent, or Firm* — Drinker Biddle & Reath LLP (57) ABSTRACT

A transmission method is used by a node of a communications network, wherein nodes communicate with one another via a carrier-sense multiple-access channel, said method comprising a step of sending a signal at a given transmit power and a given data rate to a receiver node over the channel, and wherein the transmit power of the sent signal assumes successively a first power value during a first time period and then a second power value during a second time period, the two power values being different and one of them being equal to the given power, the first time period representing the given power and the second time period representing the data rate. The invention also relates to a method of receiving a signal sent by the transmission method enabling the transmit power and the data rate used by the sender node to be deduced from the received signal.

14 Claims, 3 Drawing Sheets

(56) References Cited

U.S. PATENT DOCUMENTS

| | | |
|---|---|---|
| 2006/0146916 A1 | 7/2006 | Molisch et al. |
| 2008/0182607 A1* | 7/2008 | Behroozi et al. ............... 455/522 |
| 2009/0196245 A1* | 8/2009 | Ji .................................. 370/329 |

* cited by examiner

TECHNIQUE FOR TRANSMISSION BY A NODE OF A COMMUNICATIONS NETWORK

CROSS-REFERENCE TO RELATED APPLICATIONS

This application is the U.S. national phase of the International Patent Application No. PCT/FR2009/050829 filed May 5, 2009, which claims the benefit of French Application No. 08 53162 filed May 16, 2008, the entire content of which is incorporated herein by reference.

FIELD OF THE INVENTION

The invention relates to a transmission technique for use by a node of a communications network in which nodes communicate with one another via a carrier-sense multiple-access channel.

The invention also relates to a reception technique for use by a communications network node in such a network.

BACKGROUND

An IEEE 802.11 wireless network is one such communications network, for example.

Figure 1:
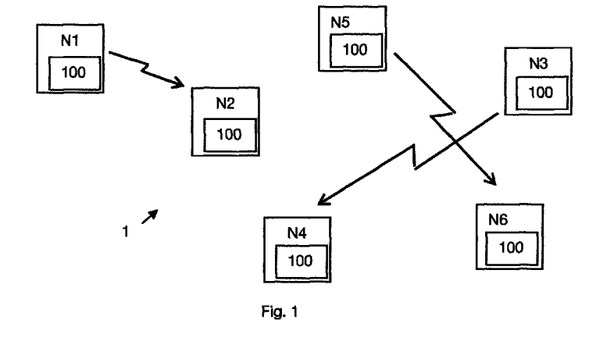
FIG. 1 shows a communications network architecture.

Consider for example the communications network shown in FIG. 1. Using the multiple-access channel, a node N1 sends data to a node N2, a node N3 sends data to a node N4, and a node N5 sends data to a node N6, a node sending when the channel is free.

A contention resolution mechanism has been defined to solve problems of simultaneous access to the channel. The node seeking to send, called the source node, measures a level of interference on the channel. If the channel is considered busy, transmission is deferred. If not, and if the channel is free for a predetermined time called the distributed interframe space (DIFS), the source node may send. The source node sends a Ready To Send (RTS) message containing information on the volume of data that it is seeking to send and its transmission data rate. The receiver node responds with a Clear To Send (CTS) message, after which the source node begins to send data. Nodes in the respective coverage areas of the source and receiver nodes that are also seeking to send then wait for the time necessary to send the data at the stated data rate.

When it has received all the data sent by the source node, the receiver node sends an acknowledgement (ACK).

It is preferable to provide power control mechanisms to increase the capacity of such a network by enabling increased spatial reuse of the channel. The power at which the source node sends is then set to a level enabling correct reception of the data by the receiver node. However, a given sending data rate is characterized by a signal-to-interference ratio threshold. If the transmit power is reduced, the chosen sending data rate may not be possible. It is therefore necessary to choose a transmit power and a sending data rate conjointly.

The paper by T-S Kim et al. published in the proceedings of the MobiCom'06 conference of September 2006 entitled "Improving Spatial Reuse Through Tuning Transmit Power, Carrier Sense Threshold, and Data Rate in Multihop Wireless Networks", proposes a mechanism for power and data rate control. In that algorithm, a source node determines in a first step a maximum power level that does not interfere with a call in progress as a function of a measured interference level and the carrier sense threshold. The source node then determines in a second step the maximum signal-to-interference ratio obtainable at the receiver node with the maximum power level determined in the first step. That requires the receiver node to send a perceived interference level to the source node. In a third step, the source node then selects a data rate $C_i$ such that a signal-to-noise ratio threshold associated with that data rate is less than the maximum signal-to-interference ratio and such that a signal-to-noise ratio threshold associated with the immediately higher data rate is greater than said maximum. A power level is then determined as a function of the signal-to-noise ratio threshold associated with the selected data rate.

That method has the following drawbacks. It relies on particular propagation models that certainly do not reflect the real propagation models. In the first step, the maximum power level is determined for the worst case. That first step relies on the assumption that there is only a single concurrent sender node. It further relies on the receiver node sending the measured interference level, which requires information to be exchanged between the source and receiver nodes before the data is actually sent.

There is therefore a need for a technique for implementing transmit power and sending data rate control taking account of a set of concurrent sender nodes.

SUMMARY

The invention responds to this requirement by proposing a transmission method for use by a node of a communications network in which nodes communicate with one another via a carrier-sense multiple-access channel, said method including a step of sending a signal at a given transmit power and a given data rate to a receiver node over the channel, and being characterized in that the transmit power of the sent signal assumes successively a first power value during a first time period and then a second power value during a second time period, the two power values being different and one of them being equal to the given power, the first time period representing the given power and the second time period representing the data rate.

Accordingly, the level of the signal sent at a given transmit power and a given sending data rate is modulated in accordance with a particular scheme by alternating two time periods and implicitly carries the power and data rate information. It is not necessary to use explicit signaling messages to send this information.

The transmission method further includes a step of determining the given power and the given data rate as a function of the nodes in the process of sending, the respective transmit powers of said nodes, and the attenuation linked to the propagation of a signal between nodes of the network.

The transmit power level and data rate are determined as a function of the sender nodes, their respective transmit powers, and attenuations linked to propagation of the signal. Accordingly, the transmission method takes account of all nodes in the process of sending and the specific media modifying propagation of the signal between the nodes. It is therefore particularly suitable for implementing power and data rate control in a communications network, enabling increased spatial reuse of the multiple-access channel.

Moreover, before the step of sending over the channel, the transmission method uses:

a step of determining an expected interference level as a function of the nodes in the process of sending; and a step of measuring a current interference level on said channel;

in which method the step of sending is effected if the difference between the expected interference level and the current interference level is below a predetermined threshold.

The sender node maintains a list of nodes in the process of sending and is thus able to determine an expected interference level. This list includes all the nodes in the process of sending and is not restricted to a single virtual concurrent sender node. If the measured level is higher than the expected interference level, then an unidentified node is in the process of sending on the channel and it is therefore not possible to seize the channel for sending. If not, the nodes in the process of sending are clearly identified and it is then possible to send at a suitable power level.

The invention also responds to this requirement by proposing a reception method for use by a node of a communications network in which nodes communicate with one another via a carrier-sense multiple-access channel, said method including:

a step of receiving a signal sent over the channel from a sender node at a given transmit power and a given data rate, the transmit power taking successively a first power value during a first time period and then a second power value during a second time period, the two power values being different;

a step of determining from the received signal first and second time periods; and a step of determining the transmit power and the data rate used by the sender node from the two time periods so determined.

This reception method is particularly suitable for receiving a signal sent using the transmission method described above, i.e. a signal having power plateaus conforming to a predetermined scheme, the signal implicitly carrying information representing the transmit power and data rate used. Accordingly, it is possible to deduce the power and the data rate used for sending by determining a first time period at a first power level and a second time period at a second power level.

The reception method further includes a step of determining the sender node as a function of a difference between the first and second powers and the attenuation linked to the propagation of the signal between the network node and the other nodes of the network.

The variation in the power level being predetermined, it is possible for the receiver node to determine the sender node as a function of the attenuation suffered by the signal during propagation from the sender node to the destination node. Thus the receiver node has a detailed knowledge of the nodes in the process of sending.

The reception method further includes a step of decoding an acknowledgement sent by the destination node of the signal to the sender node and a step of determining the attenuation linked to the propagation of the signal between the network node and the destination node.

Decoding the acknowledgement message thus enables the receiver node to determine the destination node and the attenuation linked to the propagation of the signal between the destination node and the receiver node. Thus an attenuation adapted to the actual propagation model is used instead of using a predetermined and fixed propagation model.

The invention further proposes a transmission module of a node of a communications network in which nodes communicate with one another via a carrier-sense multiple-access channel, said device including means for sending a signal at a given transmit power and a given data rate over the channel to a receiver node, characterized in that the sending means are adapted to vary the transmit power of the sent signal successively between a first power value during a first time period and a second power value during a second time period, the two power values being different and one of them being equal to the given power, the first time period representing the given power and the second time period representing the data rate.

The invention further proposes a receiver module of a node of a communications network in which nodes communicate with one another via a carrier-sense multiple-access channel, said device including:

means for receiving a signal sent over the channel from a sender node at a given transmit power and a given data rate, the transmit power taking successively a first power value during a first time period and then a second power value during a second time period, the two power values being different;

means for determining from the received signal first and second time periods; and means for determining a transmit power and a data rate used by the sender node from the two time periods so determined.

The invention further proposes a sender node of a communications network in which nodes communicate with one another via a carrier-sense multiple-access channel, the sender node including a transmission module as described above.

The invention further proposes a receiver node of a communications network in which nodes communicate with one another via a carrier-sense multiple-access channel with, the receiver node including a receiving module as described above.

The invention further proposes a communications system in which nodes communicate with one another via a carrier-sense multiple-access channel, the system including at least one sender node and at least one receiver node as described above.

The invention further proposes a computer program including instructions for executing the transmission method as described above used by a node of a communications network in which nodes communicate with one another via a carrier-sense multiple-access channel when the program is executed by a processor.

The invention further proposes a computer program including instructions for executing the reception method as described above used by a node of a communications network in which nodes communicate with one another via a carrier-sense multiple-access channel when this program is executed by a processor.

The invention further proposes a signal sent by a node of a communications network in which nodes communicate with one another via a carrier-sense multiple-access channel, said signal being sent at a given transmit power and a given data rate over the channel to a receiver node, and being characterized in that the transmit power of the sent signal takes successively a first power value during a first time period and then a second power value during a second time period, the two power values being different and one of them being equal to the given power, the first time period representing the given power and the second time period representing the data rate.

BRIEF DESCRIPTION OF THE DRAWINGS

The invention can be better understood in the light of the following description of methods of particular embodiments of the invention given with reference to the appended drawings, in which.

DETAILED DESCRIPTION

FIG. 1, commented on above, shows a communications network 1. Using the multiple-access channel, a node N1 sends data to a node N2, a node N3 sends data to a node N4, and a node N5 sends data to a node N6, a node sending when the channel is free. An IEEE 802.11 wireless network is one example of such a communications network. The nodes may be personal computers, each including a module 100 for accessing an IEEE 802.11 wireless network. They may equally be mobile telephones, wireless access points. The following description refers to an IEEE 802.11 wireless network.

It is assumed below that a node sends at a power level $P_i$, where i is in the range 1 to M, selected from a set of discrete values ranging from a value $P_{min}$ to a value $P_{max}$. The value $P_{max}$ is defined in the IEEE 802.11 standard. The node also sends at a data rate selected from a set of discrete values ranging from a value $C_1$ to a value $C_L$, this set of values also being defined in the IEEE 802.11 standard.

Figure 2:
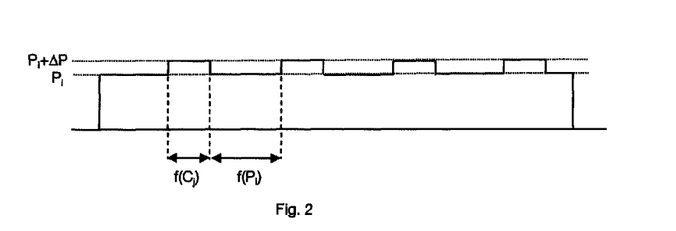
FIG. 2 shows a signal sent by a communications network node of one particular embodiment of the invention.

According to the invention, a node that sends data at a given transmit power $P_i$ and a given data rate $C_j$ modulates the power level according to a predetermined scheme as shown in FIG. 2. The predetermined scheme includes a succession of sending periods. A sending period includes a first time period $f(P_i)$ representing the transmit power followed by a second time period $f(C_j)$ representing the data rate used. These first and second time periods are of the order of a few microseconds, for example. During the first sending time period, the signal is sent at a first transmit power equal to the given transmit power $P_i$. During the second sending time period, the signal is sent at a second transmit power $P_i + \Delta P$ in a predetermined ratio to the given transmit power. The predetermined ratio is independent of the given transmit power $P_j$. For example, it may be of the order of ten percent of the maximum transmit power $P_{max}$. A node that accesses the channel in order to send repeats the sending period in this way until sending has finished. A node detecting the signal sent on the multiple-access channel thus observes substantially equal power variations and may deduce the transmit power and the data rate used by the sender node from these observations. It is therefore not necessary to use explicit signaling messages to send this information.

For example, there may be chosen for the first time period $f(P_i)$ representing the transmit power $f(P_i) = iT_p$ and for the second time period $f(C_j)$ representing the data rate $f(C_j) = jT_c$, where $T_p$ and $T_c$ are predetermined time periods known to the nodes of the communications network.

Below V denotes the set of nodes of the communications network that send signals detectable by the node N1, i.e. signals above a sensing level of the latter node.

Each node administers a current list CT of nodes in the process of sending. In the particular example shown in FIG. 1, this list for the node N1 includes the nodes N3 and N5, for example. Each node in the list is associated with a transmit power.

Each node N also administers an attenuation vector $(R_{s,N})_{s \in V}$ including the attenuation linked to the propagation of a signal between itself and the nodes of the communications network.

Each node N also administers an attenuation matrix $(Z_{s,u})_{(s,u) \in V}$ including the attenuation linked to the propagation of a signal between the nodes of the set V taken in pairs. The attenuation vector $(R_{s,N})_{s \in V}$ corresponds to a row of the attenuation matrix $(Z_{s,u})_{(s,u) \in V}$.

The transmission method used by a node N1 of the communications network referred to below as the sender node is described below with reference to FIG. 3.

Figure 3:
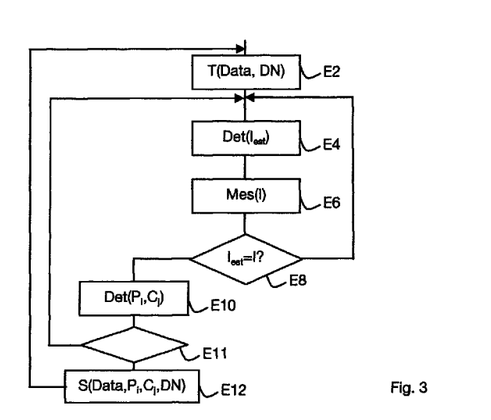
FIG. 3 shows the steps of a transmission method of one particular embodiment of the invention.

In a step E2, denoted T(Data, DN) in FIG. 3, the node N1 detects that data is to be transmitted to a destination node DN, i.e. the node N2 in the FIG. 1 example.

In a step E4, denoted Det($I_{est}$) in FIG. 3, the node N1 determines an expected interference level as a function of the current list CT of nodes in the process of sending, their respective transmit powers P, and the vector $(R_{s,N1})_{s \in V}$ of the attenuation linked to the propagation of a signal between the sender node and the nodes of the communications network of the set V. To be more precise, $I_{est}$ is defined as follows:

$$I_{est} = \sum_{s \in CT} P_s R_{s,N1}$$

In a step E6, denoted Mes(I) in FIG. 3, the node N1 measures an interference level on the multiple-access channel.

In a test step E8, the node N1 compares the interference level $I_{est}$ estimated in the step E4 with the interference level I measured in the step E6.

If the interference levels are not substantially equal, i.e. if the difference between the two interference levels is above a predetermined threshold, for example of the order of five percent, the node N1 has not correctly identified the nodes in the process of sending and the current list CT of nodes in the process of sending is therefore incorrect. A State parameter of the channel then goes to Busy and the transmission method returns to the step E4.

In a variant, the node N1 does not execute the step E4 again if the reception method has not modified the current list of nodes in the process of sending. This makes it possible to optimize the transmission method by executing the step E4 only if necessary, i.e. if the radio environment has been modified.

If the interference levels are substantially equal, i.e. the difference between the two interference levels is below the predetermined threshold, the node N1 has correctly identified the nodes in the process of sending and the current list CT of nodes in the process of sending is correct. The State parameter of the channel then goes to Free.

During a step E10, denoted Det($P_i, C_i$) in FIG. 3, the node N1 determines a transmit power level $P_i$ and a data rate $C_i$ so as not to disturb sending in progress, retaining an acceptable reception level for the destination node N2.

To be more precise, in a first substep of the step E10, the node N1 determines for each node s from the current list CT of nodes in the process of sending, called the evaluated node, an interference margin, i.e. the maximum power that the sender node N1 can use without creating a collision at the level of the evaluated node. This interference margin $MI_s$ is determined as a function of the transmit power and the data rate of the evaluated node from the matrix $(Z_{s,u})_{(s,u) \in V}$ of the attenuation linked to the propagation of a signal between the nodes of the set V taken two by two:

$$MI_s = \frac{1}{Z_{N1,r_s}} \left[ \frac{Z_{t_s,r_s} P(t_s)}{SINRTH_{C(t_s)}} - \left( N + \sum_{j \neq s} Z_{t_j,r_s}(P(t_j) + \Delta P) \right) \right]$$

where s is the evaluated node, $t_s$ is the transmitter of the node s, $r_s$ is the receiver of the node s, and $SINRTH_C$ is the signal-to-noise ratio threshold associated with the data rate C.

In a second substep of the step E10, the node N1 determines the interference MI produced at the destination node N2 by the nodes from the current list of nodes in the process of sending:

$$MI = \sum_{s \in CT} (P_s + \Delta P) Z_{s,N_2}$$

In a third substep of the step E10, the node N1 determines the highest transmit power $P_{hp}$ such that when it is increased by $\Delta P$ it is greater than the smallest of the values $MI_s$ determined during the first substep of the step E10.

Then, in a fourth substep of the step E10, the node N1 determines:
the maximum signal-to-noise ratio at the receiver node N2:

$$SINR_{rN2} = \frac{P_{hp} Z_{t_{N2}, r_{N2}}}{MI + N}$$

where N is a predetermined value that represents the level of thermal noise on the channel;
then a data rate $C_i$ such that the signal-to-noise ratio threshold associated with this data rate is immediately below the signal-to-noise ratio determined above.

In a test step E11, the node N1 determines whether the data rate determined is zero or if the power determined is zero. If so, it is not possible to send. The State parameter of the channel goes to Busy and the process returns to the step E4.

In the variant, in order to optimize the transmission method, the node N1 does not execute the step E4 again if the reception method has not modified the current list of nodes in the process of sending.

If the data rate and power values determined are not zero, a transmit power level $P_i$ and a data rate $C_i$ have therefore been determined as a function of the current list CT of nodes in the process of sending, their respective transmit powers, and the attenuation linked to the propagation of the signals between the nodes of the set V taken two by two.

Then, in a step E12, denoted $S(data, P_i, C_i, DN)$ in FIG. 3, the node N1 sends the data to the destination node N2 at the transmit power $P_i$ and at the data rate $C_i$ conforming to the predetermined scheme as defined above and shown in FIG. 2.

Thus the transmission method takes into account all nodes in the process of sending and the specific environment liable to impact the propagation of the signal between the nodes. The transmit power and the data rate used are defined in order not to disturb the other nodes in the process of sending but to remain at an acceptable level for the destination node. This control of the power and data rate thus enables a more important spatial reuse of the common channel.

When sending an acknowledgement message, instead of executing the steps of the transmission method, the sender node N1 optionally sends the signal at a constant level corresponding to the minimum sending level $P_{min}$.

The reception method used by a node N2 of the communications network, referred to below as the receiver node, is described below with reference to FIGS. 4a and 4b.

The node N2 administers a list of expected events E and a list of unidentified events UE.

Figure 4A:
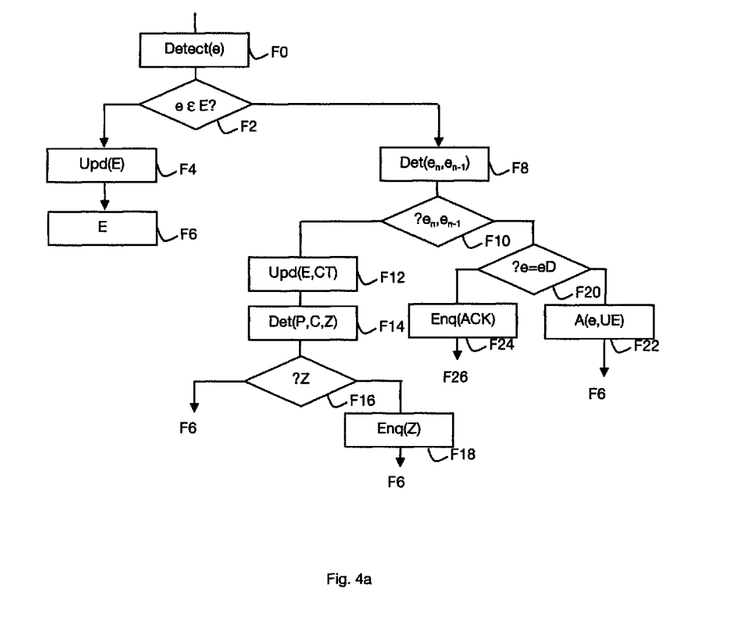
FIG. 4a shows a first subset of the steps of a reception method of one particular embodiment of the invention.

In a step F0 of detecting a power variation, denoted Detect (e) in FIG. 4a, the node N2 receives a signal on the multiple-access channel. If it detects and measures a power variation, it stores an event e defined by the measured power variation and a detection time.

Below the term event refers to detecting a power variation on the multiple-access channel. Referring to FIG. 2, these events may be linked to the sending of data by a sender node to a destination node. It should be noted that the data is not intended for the receiver node N2 but for a different destination node. The receiver node N2 uses the signal received on the multiple-access channel, notably the power level of the received signal and the detection time, to determine information relating to its environment, in particular the current list of nodes in the process of sending, the attenuation linked to the propagation of a signal between the sender node and the other nodes of the network, etc.

In a test step F2, the node N2 verifies whether the detected event e belongs to a set of expected events E.

If so, in a step F4 denoted Upd(E,CT), the node N2 updates the list of expected events and the current list of nodes in the process of sending.

The process then goes to a step F6 to await detection of a new event.

If the event e is not in the list of expected events E, in a event determination step F8, denoted $Det(e_n, e_{n-1})$ in FIG. 4a, the node N2 determines whether there are two preceding events $e_n$ and $e_{n-1}$ associated with measured power variations substantially equal to that observed for the event e. Substantially equal measured power variations means power variations of an equivalent order of magnitude, for example differing by at most five per cent.

In a step F10, the node N2 tests if two events $e_n$ and $e_{n-1}$ have been determined.

If so, the events e, $e_n$, and $e_{n-1}$ are associated with the same sending of data by a sender node. Three power variations with respective substantially equal values have thus been determined. It is then a matter of receiving a signal sent using the transmission method described above.

In an updating step F12, denoted Upd(E,CT) in FIG. 4a, the node N2 determines the sender node from the observed power variation. It knows the power variation $\Delta P$ applied by the sender node when sending the signal and thus identifies the sender node from the observed power variation and the attenuation linked to the propagation of a signal between a node of the set V and the receiver node. It then adds the identified sender node to the current list CT of nodes in the process of sending. It also updates the list of expected events E during the step F12. For example, if the event e corresponds to a positive power variation, the corresponding expected event is a negative power variation of equivalent level.

In a step F14, denoted Det(P,C,Z) in FIG. 4a, the node N2 then determines the transmit power P and the data rate C from the times associated with those variations. For example, the time difference between the event $e_{n-1}$ and the event $e_n$ makes it possible to determine a first duration equal to f(C) and thus the data rate C, and the time difference between the event $e_n$ and e makes it possible to determine a second time period f(P) and thus the power P.

During a step test F16, the node N2 checks if the matrix Z contains a row that does not contain information, for example for a node that has just been added to the set of nodes in the area defined by the sensitivity of the receiver node. If there is such a row, the node N2 demands explicitly, in a step F18 denoted "Enq(Z)" in FIG. 4a, that the node concerned send it its own attenuation measurements with the other nodes of the set. Note that this is a one-off exchange for constructing the attenuation matrix Z.

The reception method then moves on to the step F6 to await detection of an event.

If the matrix Z does not contain any empty rows, the reception method goes to the step F6 to await detection of an event.

If the result of the test executed in the step F10 is that there are no events satisfying the conditions of the step F8, then in a step F20 the node N2 checks if the observed power variation corresponds to the end of transmission from a sender node belonging to the current list of nodes in the process of sending. Knowing the power used by a sender node from the current list of nodes in the process of sending and the attenuation linked to propagation of the signal between this sender node and the receiver node, it is possible to determine whether the observed event e corresponds to this power variation.

If it is not possible to determine in the step F20 a node such that the event e corresponds to the end of sending by a node, the node N2 adds the event e to the list of unexpected events UE in a step F22 denoted A(e,UE) in FIG. 4a. The reception method then goes to the step F6 to await detection of an event.

If it has been possible in the step F20 to determine a sender node, in a step F24 denoted Enq(ACK) in FIG. 4a the node N2 commands coding of the acknowledgement message to come, i.e. an acknowledgement that the destination node of the transmission is going to send to the sender node.

Figure 4B:
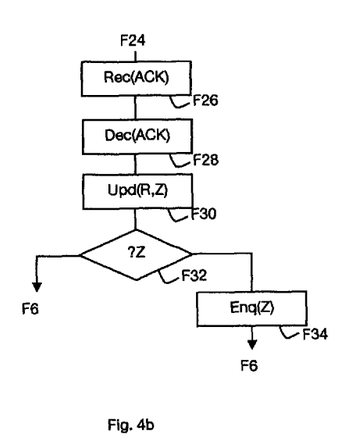
FIG. 4b shows a second subset of the steps of the reception method of one particular embodiment of the invention.

The node N2 then goes to the step F26, denoted Rec(ACK) in FIG. 4b, to wait to receive the acknowledgement message.

In a step F28, denoted Dec(ACK) in FIG. 4b, the node N2 decodes the acknowledgement message to obtain the identifiers of the sender and destination nodes.

Then, in a step F30, denoted Upd(R,Z) in FIG. 4b, the node N2 determines the attenuation between the destination node and itself and updates the attenuation vector R and the attenuation matrix Z. Thus the attenuation used is suited to the actual propagation model rather than a predetermined and fixed propagation model.

In a test step F32, the node N2 checks if the matrix Z contains a row containing no information, for example a node that has just joined the set of nodes in the area defined by the sensitivity of the receiver node. If there is such a row, the node N2 explicitly requests this node to send it its attenuation measurements with the other nodes of the set in a step F34 denoted Enq(Z) in FIG. 4b. Note that this is a one-off exchange for constructing the attenuation matrix Z.

The reception method then goes to the step F6 to await detection of an event.

If the matrix Z does not contain any empty rows, the reception method goes to the step F6 to await the detection of an event.

The description of this particular embodiment of the invention includes the management of two lists of events E and UE with the object of facilitating use of the reception method. It is nevertheless entirely possible to use the reception method without introducing these lists.

An expiry date may be associated with an event from the list in order to avoid storing events for an excessively long time.

The methods have been described for a node comprising a single sender and a single receiver. This description is easily transposed to nodes having a plurality of wireless access modules.

Figure 5:
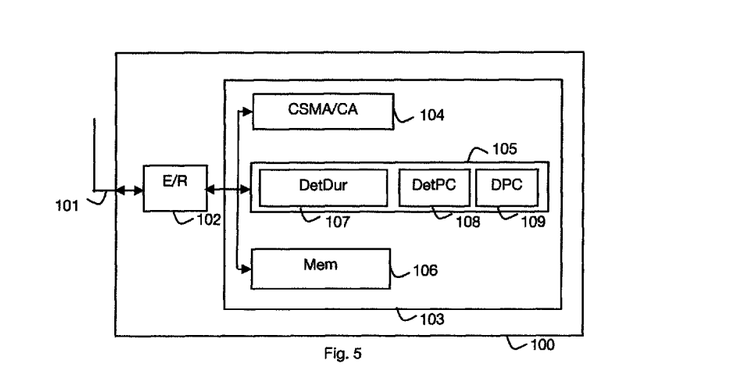
FIG. 5 shows a communications network access module of one particular embodiment of the invention.

As shown in FIG. 5, the communications network access module 100 comprises:
an antenna 101;
a module 102 comprising a sender for sending at a given power and a given data rate and a receiver for receiving such a signal, this module being adapted in particular to vary the transmit power of the sent signal successively between a first power value during a first time period and a second power value during a second time period, the two power values being different and one of them being equal to the given power, the first time period representing the given power and the second time period representing the data rate; and
a medium access control (MAC) module 103 for controlling access to the resources.

This resource access control module 103 comprises three secondary modules:
a first module 106 for storing three parameters, namely a transmit power $P_t$, a data rate $C_j$, and a channel State: Busy or Free;
a second module 104 for implementing the carrier sense multiple access with collision avoidance (CSMA/CA) protocol defined for IEEE 802.11 wireless networks; and
a third module 105 for implementing the steps of the above transmission and reception methods in order to determine the three parameters.

The three parameters are shared by the two modules 104 and 105.

The third module 105 comprises three sub-modules:
a sub-module 107, denoted DetDur in FIG. 5, for determining first and second time periods from the received signal;
a sub-module 108, denoted DetPC in FIG. 5, for determining from the first and second time periods so determined a transmit power and a data rate used by the sender node; and
a sub-module 109, denoted DPC in FIG. 5, for determining a transmit power and a data rate to be used to send data as a function of the nodes in the process of sending, the respective transmit powers of those nodes, and the attenuation linked to the propagation of a signal between the nodes of the network.

The time period determination sub-module 107 is furthermore adapted to detect power variation in a received signal and to associate a detection time therewith. It is further adapted to determine three power variations of substantially equal values.

The sub-module 108 is further adapted to determine a sender node as a function of the difference between the first and second powers and the attenuation linked to the propagation of the signal between the network node and the other network nodes. It is also adapted to decode an acknowledgement message sent to the sender node by the destination node of the received signal and to determine the attenuation linked to the propagation of the signal between the network node and the destination node of the received signal.

The sub-module 109 is further adapted to determine an expected level of interference as a function of a current list of nodes in the process of sending and to compare it with a current level of interference on said channel, the State parameter of the channel going to Free if the difference between the expected interference level and the current interference level is below a predetermined threshold.

The modules 102 and 109 are adapted to implement the transmission method described above. They are preferably software modules comprising software instructions for executing the steps of the transmission method described above when executed by a processor of a node of a communications network.

Thus the invention further provides:
a computer program including instructions for executing the above transmission method when the program is executed by a processor; and
a storage medium readable by a node for storing the above computer program.

The modules 102, 107, 108 are adapted to execute the reception method described above. They are preferably software modules comprising software instructions for executing the steps of the above reception method when executed by a processor of a node of a communications network.

Thus the invention further provides:
a computer program including instructions for executing the above reception method when the program is executed by a processor; and
a storage medium readable by a node for storing the above computer program.

The software modules may be stored in or transmitted by a data medium. This may be a hardware storage medium, for example a CD-ROM, a magnetic diskette or a hard disk, or a transmission medium such as an electrical, optical or radio signal, or a telecommunications network.

In the embodiment described, the communications network access module 100 is adapted to send as well as to receive. An embodiment may equally be envisaged including separate sending and receiving modules communicating via an internal bus.

In the embodiment described, a node serves at the same time as the sender node by executing the transmission method and the receiver node by executing the reception method. Using the methods independently of each other may nevertheless be envisaged.

The invention claimed is:

1. A transmission method of use by a node of a communications network, wherein nodes communicate with one another via a carrier-sense multiple-access channel, said method comprising steps of:
   sending a signal at a given transmit power and a given data rate to a receiver node over the channel; and
   successively assuming, utilizing the transmit power of the sent signal, a first power value during a first time period, and then a second power value during a second time period following the first time period, the first time period and the second time period being included in a sending period, the two power values being different from one another, and one of them being equal to the given transmit power, the first time period being a predetermined function of the given transmit power and not the data rate and the second time period being a predetermined function of the data rate and not the given transmit power.

2. The transmission method according to claim 1, comprising a step of determining the given power and the given data rate as a function of the nodes in the process of sending, the respective transmit powers of said nodes, and the attenuation linked to the propagation of a signal between nodes of the network.

3. The transmission method according to claim 1, comprising before the step of sending over the channel steps of:
   determining an expected interference level as a function of the nodes in the process of sending; and
   measuring a current interference level on said channel;
   in which method the sending step is effected if the difference between the expected interference level and the current interference level is below a predetermined threshold.

4. A reception method of use by a node of a communications network, wherein nodes communicate with one another via a carrier-sense multiple-access channel, said method comprising steps of:
   receiving a signal sent over the channel from a sender node at a given transmit power and a given data rate, the transmit power taking successively a first power value during a first time period that is based on a predetermined function of the given transmit power and not the given data rate and then a second power value during a second time period following the first time period, the first time period and the second time period being included in a sending period that is based on a predetermined function of the given data rate and not the given transmit power, the two power values being different;
   determining from the received signal first and second time periods; and
   determining the transmit power and the data rate used by the sender node from the two time periods so determined.

5. The reception method according to claim 4, further comprising a step of determining the sender node as a function of a difference between the first and second powers and the attenuation linked to the propagation of the signal between the network node and the other nodes of the network.

6. The reception method according to claim 4, further comprising steps of:
   decoding an acknowledgement sent by the destination node of the signal to the sender node; and
   determining the attenuation linked to the propagation of the signal between the network node and the destination node.

7. A transmission module of a sender node of a communications network, wherein nodes communicate with one another via a carrier-sense multiple-access channel, said module comprising:
   means for sending a signal at a given transmit power and a given data rate over the channel to a receiver node,
   wherein the transmission module is adapted to vary the transmit power of the sent signal successively between a first power value during a first time period that is based on a predetermined function of the given transmit power and not the given data rate and a second power value during a second time period following the first time period, the first time period and the second time period being included in a sending period that is based on a predetermined function of the given data rate and not the given transmit power, the two power values being different and one of them being equal to the given power, the first time period representing the given power and the second time period representing the data rate.

8. A receiver module of a node of a communications network, wherein nodes communicate with one another via a carrier-sense multiple-access channel, said receiver module configured to:
   receive a signal sent over the channel from a sender node at a given transmit power and a given data rate, the transmit power taking successively a first power value during a first time period that is based on a predetermined function of the given transmit power and not the given data rate and then a second power value during a second time period following the first time period, the first time period and the second time period being included in a sending period that is based on a predetermined function of the given data rate and not the given transmit power, the two power values being different;
   determine from the received signal first and second time periods; and
   determine a transmit power and a data rate used by the sender node from the two time periods so determined.

9. A sender node of a communications network, wherein nodes communicate with one another via a carrier-sense multiple-access channel, the sender node comprising the transmission module according to claim 7.

10. A receiver node of a communications network, wherein nodes communicate with one another via a carrier-sense multiple-access channel with, the receiver node comprising the receiving module according to claim 8.

11. A communications system, wherein nodes communicate with one another via a carrier-sense multiple-access channel, the system comprising at least:
  one sender node according to claim 9; and
  at least one receiver node of a communications network, wherein nodes communicate with one another via a carrier-sense multiple-access channel with, the receiver node comprising the receiving module of a node of a communications network nodes communicate with one another via a carrier-sense multiple-access channel, said receiving module configured to:
  receive a signal sent over the channel from a sender node at a given transmit power and a given data rate, the transmit power taking successively a first power value unrelated to the given data rate during a first time period and then a second power value unrelated to the given data rate during a second time period following the first time period, the first time period and the second time period being included in a sending period, the two power values being different;
  determine from the received signal first and second time periods; and
  determine a transmit power and a data rate used by the sender node from the two time periods so determined.

12. An article of manufacture including a non-transitory computer readable media with instructions encoded and stored thereon, the stored instructions, when executed causes a processor to perform the steps of:
  sending a signal at a given transmit power and a given data rate to a receiver node over the channel from a sender node; and
  successively assuming, by the transmit power of the sent signal a first power value during a first time period and then a second power value during a second time period, the two power values being different and one of them being equal to the given transmit power, the first time period being a predetermined function of the given transmit power and not the given data rate and the second time period following the first time period, the first time period and the second time period being included in a sending period being a predetermined function of the data rate and not the given transmit power.

13. An article of manufacture including a non-transitory computer readable media with instructions encoded and stored thereon, the stored instructions, when executed causes a processor to perform the steps of:
  receiving a signal sent over the channel from a sender node at a given transmit power and a given data rate, the transmit power taking successively a first power value during a first time period that is based on a predetermined function of the given transmit power and not the given data rate and then a second power value during a second time period following the first time period, the first time period and the second time period being included in a sending period that is based on a predetermined function of the given data rate and not the given transmit power, the two power values being different;
  determining from the received signal first and second time periods; and
  determining the transmit power and the data rate used by the sender node from the two time periods so determined.

14. A transmission method of use by a node of a communications network, wherein nodes communicate with one another via a carrier-sense multiple-access channel, said method comprising:
  sending, by a source node of the communications network, a signal at a given transmit power and a given data rate over the channel to a receiver node, and wherein the transmit power of the sent signal takes successively a first power value during a first time period and then a second power value during a second time period following the first time period, the first time period and the second time period being included in a sending period, the two power values being different and one of them being equal to the given transmit power, the first time period being a predetermined function of the given transmit power and not the given data rate and the second time period being a predetermined function of the given data rate and not the given transmit power.

\* \* \* \* \*